(12) United States Patent
Veneziano et al.

(10) Patent No.: US 9,206,868 B2
(45) Date of Patent: Dec. 8, 2015

(54) BRAKING BAND AND DISC FOR A DISC BRAKE

(71) Applicant: Freni Brembo S.P.A., Bergamo (IT)

(72) Inventors: Aristide Veneziano, Bergamo (IT); Silvio Persico, Bergamo (IT); Raffaello Passoni, Bergamo (IT)

(73) Assignee: FRENI BREMBO S.P.A., Bergamo (IT)

( * ) Notice: Subject to any disclaimer, the term of this patent is extended or adjusted under 35 U.S.C. 154(b) by 19 days.

(21) Appl. No.: 13/965,286

(22) Filed: Aug. 13, 2013

(65) Prior Publication Data

US 2013/0327603 A1 Dec. 12, 2013

Related U.S. Application Data

(62) Division of application No. 13/387,738, filed as application No. PCT/IT2010/000340 on Jul. 29, 2010, now Pat. No. 8,511,443.

(30) Foreign Application Priority Data

Jul. 29, 2009 (IT) ............................. MI2009A1359

(51) Int. Cl.
*F16D 65/12* (2006.01)
*F16D 65/02* (2006.01)

(52) U.S. Cl.
CPC .............. *F16D 65/128* (2013.01); *F16D 65/12* (2013.01); *F16D 2065/1328* (2013.01)

(58) Field of Classification Search
CPC F16D 65/12; F16D 65/128; F16D 2065/1328

USPC ........... 188/264 A, 264 AA, 264 R, 218 XL, 188/264 D, 71.6
See application file for complete search history.

(56) References Cited

U.S. PATENT DOCUMENTS

| | | | | | |
|---|---|---|---|---|---|
| 2,345,016 | A | * | 3/1944 | Tack | 188/218 XL |
| 2,345,017 | A | * | 3/1944 | Tack | 188/264 A |
| 2,380,085 | A | * | 7/1945 | Tack et al. | 188/218 XL |
| 3,298,476 | A | * | 1/1967 | Day | 188/218 A |
| 3,314,509 | A | * | 4/1967 | Pelikan | 188/218 XL |
| 3,391,763 | A | * | 7/1968 | Severson | 188/218 XL |
| 3,394,780 | A | * | 7/1968 | Hodkinson | 188/218 XL |
| 3,623,577 | A | * | 11/1971 | Scharlack | 188/71.6 |
| 3,730,304 | A | * | 5/1973 | Buyze | 188/218 XL |
| 4,712,656 | A | | 12/1987 | Courtois | |
| 5,427,212 | A | | 6/1995 | Shimazu et al. | |
| 5,526,905 | A | | 6/1996 | Shimazu | |
| 5,810,123 | A | | 9/1998 | Giorgetti et al. | |
| 6,193,023 | B1 | * | 2/2001 | Telfer | 188/71.6 |
| 6,260,669 | B1 | * | 7/2001 | Daudi | 188/71.6 |
| 6,367,599 | B2 | * | 4/2002 | Kobayashi | 188/218 XL |
| 6,386,341 | B1 | * | 5/2002 | Martin | 188/218 XL |

(Continued)

FOREIGN PATENT DOCUMENTS

| | | |
|---|---|---|
| EP | 1352179 | 4/2004 |
| EP | 2031266 | 3/2009 |

(Continued)

*Primary Examiner* — Thomas Irvin
(74) *Attorney, Agent, or Firm* — Tarter Krinsky & Drogin LLP

(57) ABSTRACT

Braking bands of discs for disc brakes, capable of both the efficient discharge of heat and of high mechanical performance at low weight are provided.

8 Claims, 15 Drawing Sheets

(56) References Cited

U.S. PATENT DOCUMENTS

| | | | |
|---|---|---|---|
| 6,446,770 B2* | 9/2002 | Qian et al. | 188/218 XL |
| 6,505,723 B1* | 1/2003 | Annear | 192/70.12 |
| 6,739,437 B2 | 5/2004 | Garfinkel et al. | |
| 7,097,010 B1 | 8/2006 | Hulten et al. | |
| 7,100,748 B2* | 9/2006 | Prahst | 188/218 XL |
| 7,219,777 B2* | 5/2007 | Lin | 188/218 XL |
| 7,267,210 B2 | 9/2007 | Cornolti et al. | |
| 7,281,613 B2* | 10/2007 | Weiss | 188/264 A |
| 8,360,213 B2 | 1/2013 | Biondo | |
| 9,062,730 B2 | 6/2015 | Waninger et al. | |
| 2004/0124045 A1* | 7/2004 | Mathern | 188/218 XL |
| 2006/0086578 A1* | 4/2006 | Weiss | 188/218 XL |
| 2008/0067018 A1* | 3/2008 | Smith et al. | 188/218 XL |
| 2008/0142319 A1* | 6/2008 | Manter | 188/218 XL |
| 2009/0000884 A1* | 1/2009 | Layton et al. | 188/218 XL |
| 2010/0230221 A1* | 9/2010 | Biondo et al. | 188/218 XL |
| 2011/0061980 A1* | 3/2011 | Anderson | 188/218 XL |

FOREIGN PATENT DOCUMENTS

| | | |
|---|---|---|
| WO | 2008/136032 | 11/2008 |
| WO | 2008135876 | 11/2008 |

* cited by examiner

BRAKING BAND AND DISC FOR A DISC BRAKE

CLAIM OF PRIORITY

This application is a Divisional of U.S. patent application Ser. No. 13/387,738, filed on Feb. 28, 2012, which is a National Phase Application of PCT International Application No. PCT/IT2010/000340, International Filing Date, 29 Jul. 2010, claiming priority to Italian Patent Application No. MI2009A001359, filed 29 Jul. 2009.

BACKGROUND OF THE INVENTION

1. Field of the Invention

The present invention refers to a braking band and to a disc for a ventilated disc brake, particularly, but not exclusively, for applications in the automobile industry.

In particular, the present invention refers to a braking band of the ventilated type suitable for high-performance vehicles.

2. Description of the Related Art

As known, discs of the type specified above consist of two coaxial parts or plates. A first part or plate is suitable for connecting to a support bell that in turn is intended to be connected to a wheel hub of a vehicle. The remaining peripheral part of the disc, which comprises the two plates and is commonly known as braking band, is intended to cooperate with disc brake calipers suitable for exerting a braking action on the vehicle, exerting friction, through pads, on opposite surfaces of the two plates, known as braking surfaces.

It is also known that, during the actuation of the brakes, the friction between the pads of the brake calipers and the braking surfaces of the braking band generates a large amount of heat that needs to be disposed of.

Indeed, the heat generated causes numerous undesired phenomena to occur, like for example the deformation of the braking band, the formation of cracks on the braking surfaces or localised transformations of state of the material constituting the braking band that in turn lead to the deterioration of the braking band itself.

In particular, in applications on high-performance vehicles having high braking efficiency, the energy to be disposed of is very high and the aforementioned need to dispose of the heat generated during braking is even greater.

This need to increase cooling efficiency must however be offset with the further need to keep the bulk of the discs unchanged in order to avoid modifications of the suspension of the vehicle for which they are intended.

These braking bands are present in discs commonly known as ventilated discs. These ventilated discs have undergone a continuous evolution over time, in particular with regard to the number and configuration of the so-called ventilation channels, thus defining the gap that is formed by the two plates axially facing one another. Such ventilation channels are in turn limited on the inside by connection elements that transversally connect the two plates, elements defined as blades or tabs.

For example, from U.S. Pat. No. 5,427,212 tabs are known consisting of curved walls that are repeated with a modular frequency and in which the module itself consists of two tabs one of which is longer than the other.

For example from U.S. Pat. No. 5,526,905 and U.S. Pat. No. 5,526,905 tabs are known consisting of straight walls that are repeated with a modular frequency and in which the module consists of two tabs arranged on two circumferential modules, one inside of the other.

Another example of tabs of this type is known from U.S. Pat. No. 4,712,656.

From U.S. Pat. No. 7,100,748 tabs are known consisting of curved walls that are repeated with a modular frequency in the circumferential direction, in which one of the tabs bends radially coming out from the braking band to form connection elements of the band at the bell of the support disc to the hub of the vehicle.

From WO 2008/136032 tabs are known consisting of curved walls that are repeated with a modular frequency and in which the module consists of two tabs arranged on two circumferential modules, one inside the other.

Finally, from EP 1 352 179 tabs are known consisting of curved walls that are repeated with a modular frequency and in which the module consists of a long tab alongside three short tabs that are radially aligned with one another.

The aforementioned examples of a disc for a disc brake and of braking bands are not able to ensure effective cooling that at the same time ensures that the mass and weight of the disc for a disc brake are kept low.

SUMMARY OF THE INVENTION

The problem forming the basis of the present invention is therefore to devise a braking band and a disc for a disc brake, which has structural and functional characteristics such as to satisfy the aforementioned requirements and, at the same time, to avoid the quoted drawbacks with reference to the prior art.

Such a problem is solved by a braking band and disc for a disc brake in accordance with the claims.

According to a general embodiment of the invention, a braking band of a disc for a disc brake comprises a first plate and a second plate arranged facing one another so as to form a gap. A group of connection-spacer elements connect the first plate to the second plate. Said group constitutes a module "M" that is repeated according to a circumferential direction coaxial with the braking band itself. Said group of spacer elements comprises a first tab that connects the first plate to the second plate and that extends according to a longitudinal line that forms a first arched section, having a first concavity that goes the same way along its entire longitudinal extension, as well as a second arched section, having a second concavity that goes the same way for its entire longitudinal extension, said second concavity of said second section being oriented the same way as the concavity of the first section. Said second section is foreseen circumferentially offset with respect to said first section. Said line of longitudinal extension of the first tab comprises an intermediate section that joins together the first and the second section. Said intermediate section is shaped like an "S".

In accordance with a further embodiment, said group of spacer elements also comprises a second tab that extends according to a second longitudinal line proceeding substantially radially from one of the ends of said first tab. Advantageously, said second tab is circumferentially offset with respect to said end of the first tab. Preferably, said second longitudinal line of the second tab forms an arc that defines a third concavity that goes the same way along its entire longitudinal extension.

In accordance with an embodiment, the first and second concavities of the first tab and the third concavity of the second tab are all oriented the same way, preferably, but not necessarily, facing the opposite way to the way in which the braking band rotates.

In accordance with an embodiment, said first section of the longitudinal line of the first tab is an arc of circle.

In accordance with an embodiment, said second section of the longitudinal line of the first tab is an arc of circle with different concavity with respect to the concavity of the first section of the longitudinal line of the first tab.

In accordance with an embodiment, said first tab extends radially for a shorter section than the overall radial extension of the braking band, so as not to poke out from the gap.

In accordance with an embodiment, said second section of the longitudinal line of the first tab is circumferentially offset with respect to the first section of the longitudinal line by an amount equal to or greater than the thickness of the first tab evaluated transversally to the line of longitudinal extension or middle line of the first tab.

In accordance with an embodiment, the first tab extends from a first circumference to a second circumference coaxial to the rotation axis of the braking band and remaining inside the radial extension of the gap.

In accordance with an embodiment, said second tab extends from a third circumference to a fourth circumference coaxial to the rotation axis of the braking band and arranged radially inside or towards the rotation axis of the band with respect to the first tab, so that said second tab is not arranged circumferentially overlapping said first tab and leaves a gap or circumferential channel between said first tab and said second tab.

In accordance with an embodiment, said second tab extends along a circumference, the extension of which beyond the extension of said second tab is incident on said second section of extension of said first tab going away from said rotation axis of the braking band.

In accordance with an embodiment, a disc for a disc brake comprises a braking band as described previously.

BRIEF DESCRIPTION OF THE DRAWINGS

Further characteristics and advantages of the braking band and of the disc for a disc brake according to the invention will become clear from the following description of some preferred example embodiments thereof, given for indicating and not limiting purposes, with reference to the attached figures, in which.

DETAILED DESCRIPTION OF THE PREFERRED EMBODIMENTS

Figure 1:
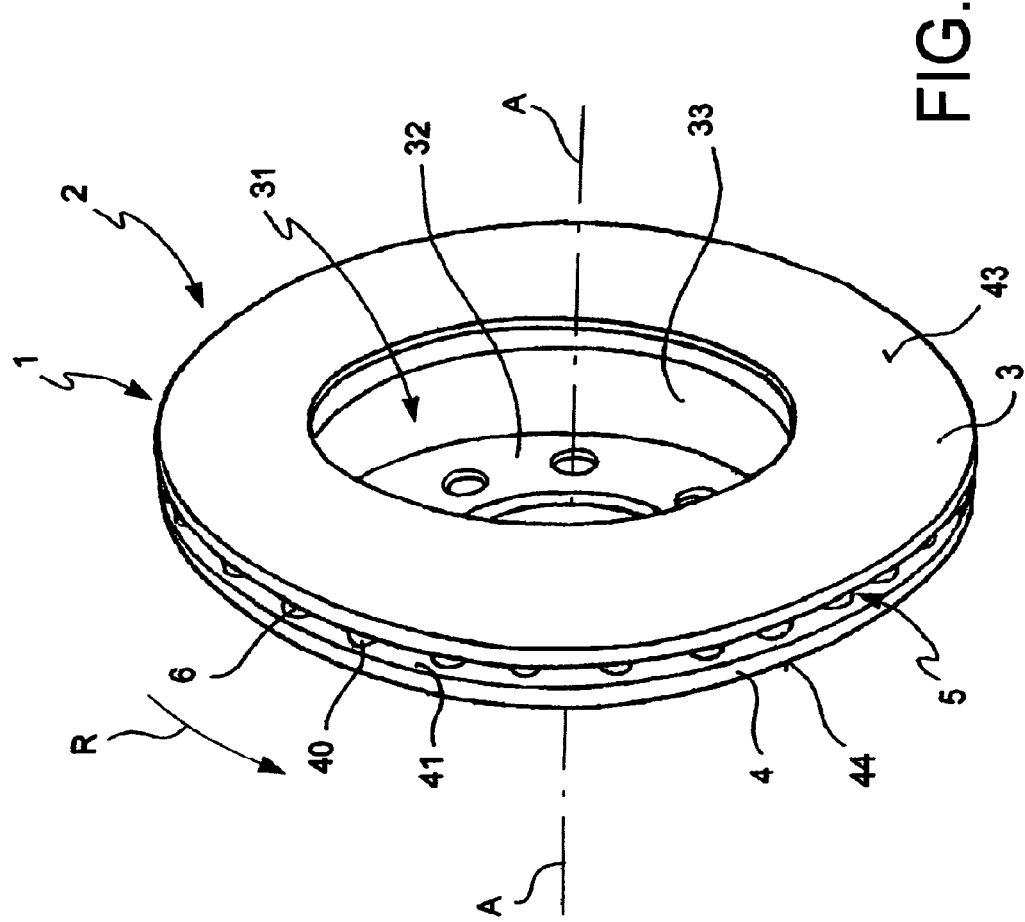
FIG. 1 illustrates a perspective view of a disc for a disc brake made according to the invention and comprising a braking band having a plate connected as a single piece with a bell for connecting to a hub of a vehicle.

From the figures it is possible to see a braking band 1 of a disc for a disc brake, wholly indicated with reference numeral 2.

In accordance with an embodiment, the braking band 1 is connected in one piece or in a single body to a bell 31 to be associated through a flange 32, arranged at the end of a cylindrical body 33 of the bell 31, with a hub of a suspension system of a vehicle, so as to rotate (R) as a unit with the hub and with the wheel of the vehicle about a rotation axis A-A.

Advantageously, the braking band 1 comprises a first plate 3 facing a second plate 4, both arranged coaxially to the axis A-A of the braking band 1.

Advantageously, the opposite surfaces 40, 41 of the plates 3, 4 define a gap 5 or ventilation duct, inside the braking band. The first 3 and the second 4 plate are connected together and kept apart by a group of connection-spacer elements 6, 7.

Said plates 3, 4 also define opposite outer braking surfaces 43 and 44, suitable for cooperating with a caliper for a disc brake that, through an opposite axial action, exerts a braking action by friction on the braking surfaces 43, 44, which opposes the rotation R of the disc for a disc brake 2. (FIG. 1)

In accordance with an embodiment, the braking band 1 of the disc for a disc brake 2, connects with its plate 3 in a removable manner to a bell 31, for example, but not necessarily, of different material.

Advantageously, in accordance with an embodiment, the braking band 1 has protuberances 49 suitable for coupling with connection means 50, for example made so as to allow a radial expansion of the braking band 1 during the thermal cycle determined by the braking action.

In accordance with an embodiment, irrespective of whether the braking band 1 is in one piece with a bell 31 or can be removably coupled with a bell 31, on its braking surfaces 43, 44 it has elements suitable for aerating the braking surfaces and/or dressing the surfaces of the opposite pads. For example, in the braking surfaces 60 and/or 61 are made substantially distributed circumferentially and over the entire radial height B of the braking surfaces.

Figure 2:
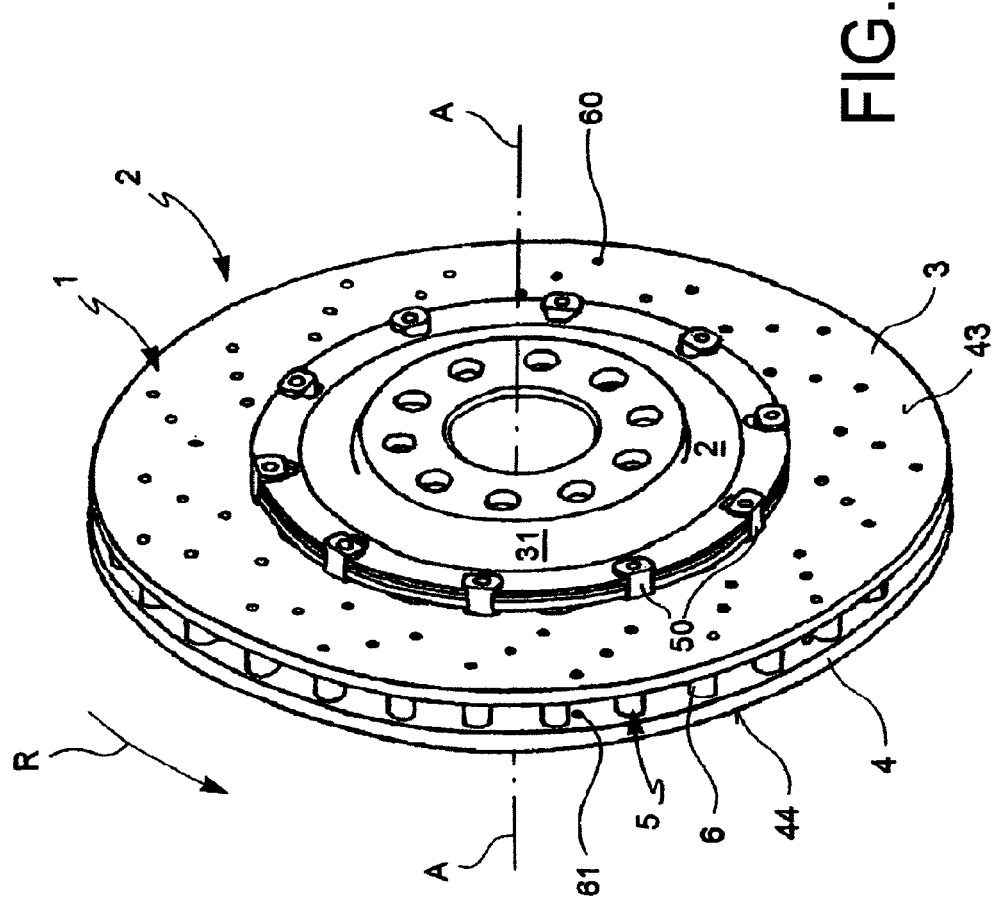
FIG. 2 illustrates a perspective view of un disc for a disc brake comprising a braking band made according to the invention and removably connected with a bell.

For example, in the plates 3, 4 holes 60 are made that can also be blind or pass all the way through 61 placing the ventilation duct or gap 5 in communication with the braking surface 43, 44. (FIG. 2).

In accordance with an embodiment, the braking band 1 has an axial-symmetrical body suitable for rotating about an axis A-A.

Figure 3:
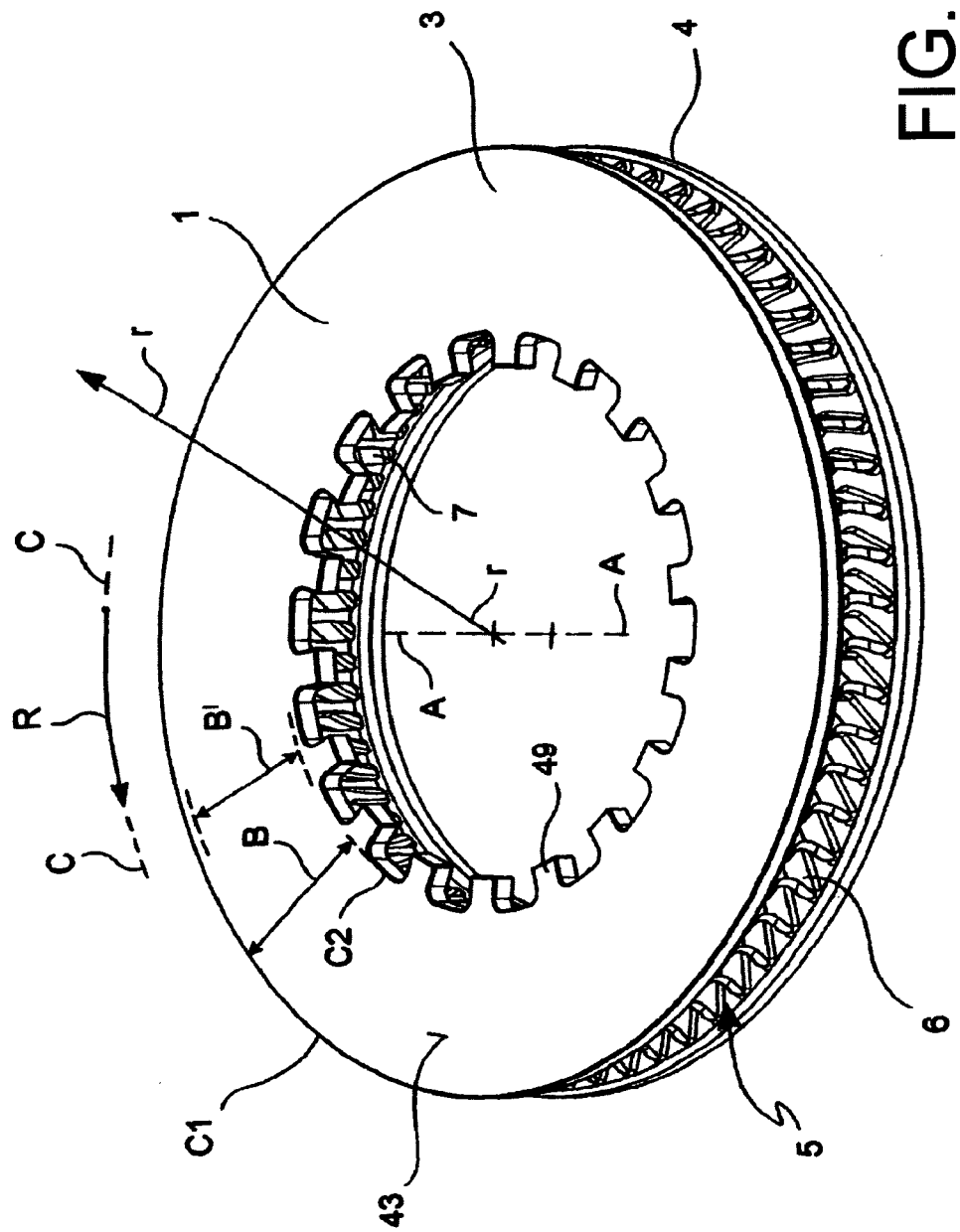
FIG. 3 illustrates a perspective view of a braking band made according to the invention.

The disc-shaped configuration of the braking band defines, in addition to the axial direction parallel to the rotation axis A-A, a radial direction r-r transversal to the rotation axis A-A, and a circumferential direction C-C transversal to the radial direction (FIG. 3).

In accordance with an embodiment, the braking band 1, when suitable for being removably associated with a bell 31, advantageously has protuberances 49 that project radially towards the rotation axis and are suitable for being associated with connection means 50 or, advantageously for being incorporated through co-fusion or geometric coupling in seats foreseen in the body of the bell 31.

Preferably, the plates 3, 4 of the braking band 1 extend from an outer edge C1 to an inner edge C2, defining a height B of the braking band 1. Said height B of the braking band is slightly greater than the height of the braking surface 43, 44 brushed by the pads, in the figures and in particular in FIG. 3 indicated with reference letter B'.

In accordance with an embodiment, the braking surface 43, 44, and particularly its portion suitable for being brushed by the pads, has means suitable for dressing the pads and/or for evacuating the dust of the friction material that is produced during the braking action and/or for evacuating the water possibly deposited on the braking surface. For example, on the braking surface 43, 44 there are grooves 70 that, preferably, covers the entire height B' of the braking surface 43, 44 brushed by the pads (FIG. 4).

Figure 4:
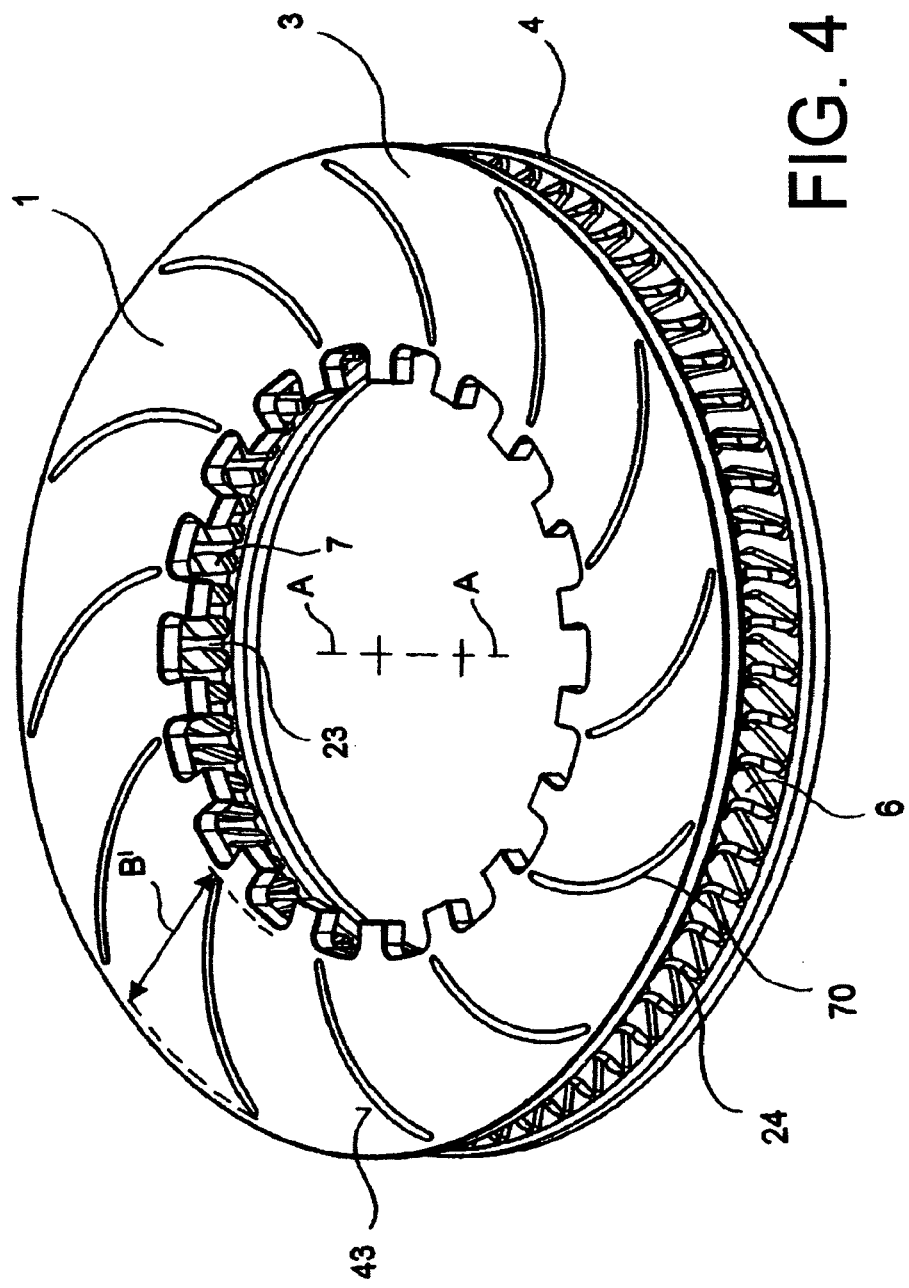
FIG. 4 illustrates a perspective view of a braking band made according to the invention, the opposite braking surfaces of which have grooves.

As can be seen from FIGS. 3 and 4, the connection and spacing elements between the plates 6, 7 have edges 23, 24 that face towards the rotation axis A-A of the braking band 1 and look away from said rotation axis A-A, respectively.

In accordance with an embodiment, said inner 23 and outer 24 edges of the spacer elements 6, 7 are mechanically processed in order to statically and dynamically balance the disc-shaped body of the braking band 1. For example, the inner surface of the inner edge 23 or surface facing towards the rotation axis A-A is levelled off through mechanical chip-removal.

Figure 7:
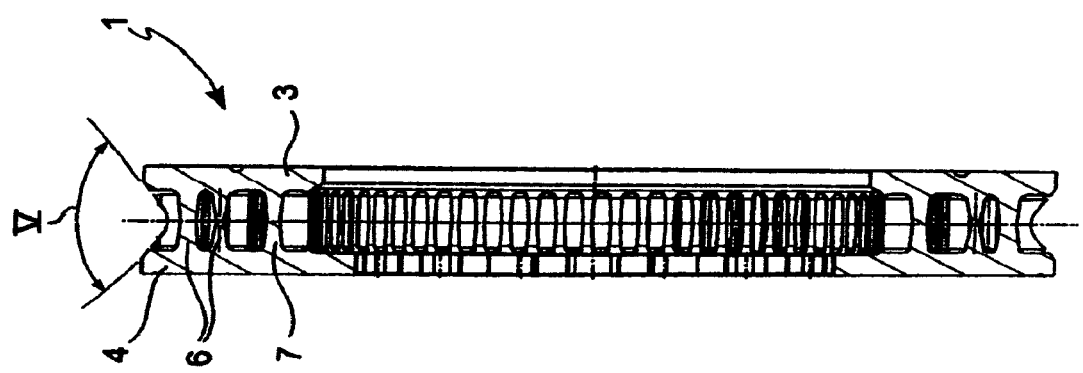
FIG. 7 illustrates a section according to the line VII-VII of FIG. 6 of the plate of FIG. 4.
Figure 9:
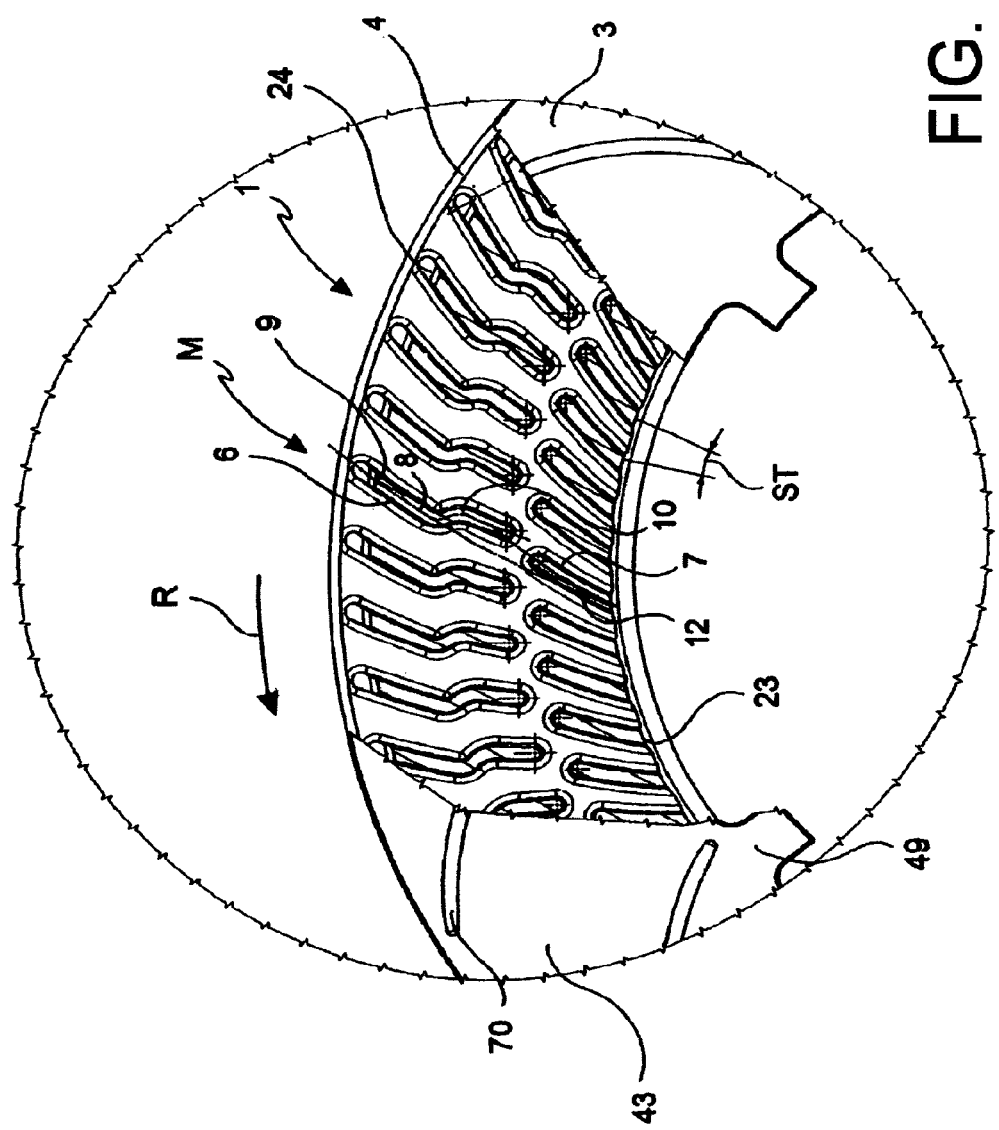
FIG. 9 illustrates an enlargement of the partial section of FIG. 6.

In accordance with an embodiment the outer surface, or the surface arranged on the outer edge away from the rotation axis A-A, indicated in FIG. 4 with reference numeral 24, is processed through turning and/or milling, with a shape substantially in a "V" (see also FIG. 7).

Figure 5:
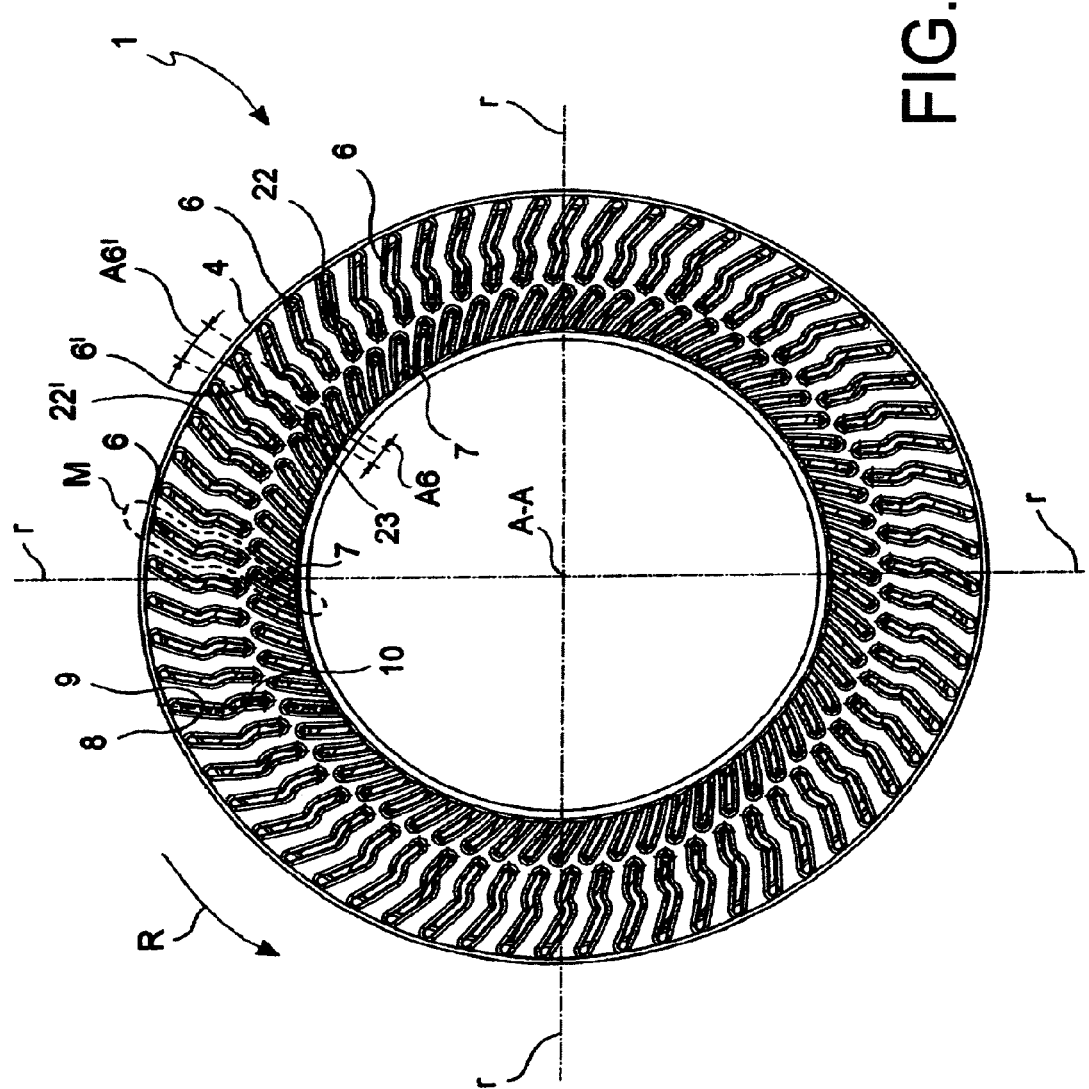
FIG. 5 illustrates a section according to a middle plane transversal to the rotation axis of the braking band of FIG. 4.

In accordance with a general embodiment, a braking band 1 of a disc for a disc brake 2, comprises a first plate 3 and a second plate 4. Said plates are arranged facing one another so as to form a gap 5. Advantageously, the two plates are connected together by a group of connection and spacer elements 6, 7. Preferably, said group of connection and spacer elements 6, 7 constitutes a module M that is repeated in the circumferential direction C-C remaining coaxial with the braking band itself (FIG. 5).

Preferably, the group of spacer elements 6, 7 comprises a first tab or fin 6 that connects the first plate 3 to the second plate 4 and a second tab or fin 7 that connects the first plate 3 to the second plate 4.

Said first tab 6 extends according to a longitudinal line 8 and forms a first arched section 9 that has a concavity going the same way in its entire longitudinal extension. Said longitudinal line 8 has a second arched section 10 that has a second concavity (in FIG. 10 the first concavity is indicated through the radius R1, whereas the second concavity is indicated with the radius R2, references which can also be seen in FIG. 6).

Preferably, said second arched section 10 has a second concavity R2 going the same way as the first concavity R1 of the first arched section 9.

Advantageously, said second arched section 10 is circumferentially offset with respect to the first arched section 9.

Further advantageously, said line of longitudinal extension 8 of the first tab 6 comprises an intermediate section 11 that joins the first arched section 9 to the second arched section 10. With further particular advantage, said intermediate section 11 is S-shaped.

In accordance with a further embodiment, a first tab 6 has two walls (the longitudinal extensions of which are indicated in the figures with reference numerals 9 and 10) connecting the two plates 3 and 4. These walls 9 and 10 are slightly circumferentially offset with respect to one another and with concavity facing the same way, preferably the opposite way to the rotation R of the braking band. In other words, in accordance with a particular embodiment, it is as if two spoons were made fixedly connected to another and to the opposite inner surfaces of the plates 3 and 4. These spoons are slightly offset from one another in the circumferential direction and face the same way and are connected to one another by an S-shaped joining wall.

From the embodiments described above it can be seen that, having the two arched sections 9, 10 with concavity facing the same way R1, R2, the line of longitudinal extension 8 (as can be seen from the section for example depicted in FIG. 10 or in FIG. 6) has an intermediate section 11 in which two changes of concavity are made, a first change of concavity going from R1 of the arched section 9 to the intermediate section 11 and a second change of concavity in going from the intermediate section 11 to the second arched section 10. In other words, said intermediate section in shaped like a double "S" in which the second "S" has limited extension with respect to the more accentuated first "S".

In other words, the first arched section 9 of uniform concavity is followed by a section for joining to the intermediate section 11 that ends with a change of concavity followed by a second joining section of the intermediate section 11 having opposite concavity that ends with a change of concavity that proceeds with the second arched section 10 of matching concavity with that of the first arched section 9.

In accordance with an embodiment, not necessarily in combination with what has been described above, the group of connection and spacing elements comprises, in addition to a first tab 6, a second tab 7. Said second tab 7 extends according to a longitudinal line 12, as if it were a substantially radial continuation of the first tab 6 from one of its ends 22.

In accordance with an embodiment, the first tab 6 is arranged in an outer annular portion, i.e. away from the axis of the disc A-A and the second tab 7 extends substantially as a radial continuation, even if detached from the first tab, towards an inner annular portion of the braking band 1.

Said second tab 7 extends leaving circumferentially offset with respect to the end 22 of the first tab that is faces.

Figure 10:
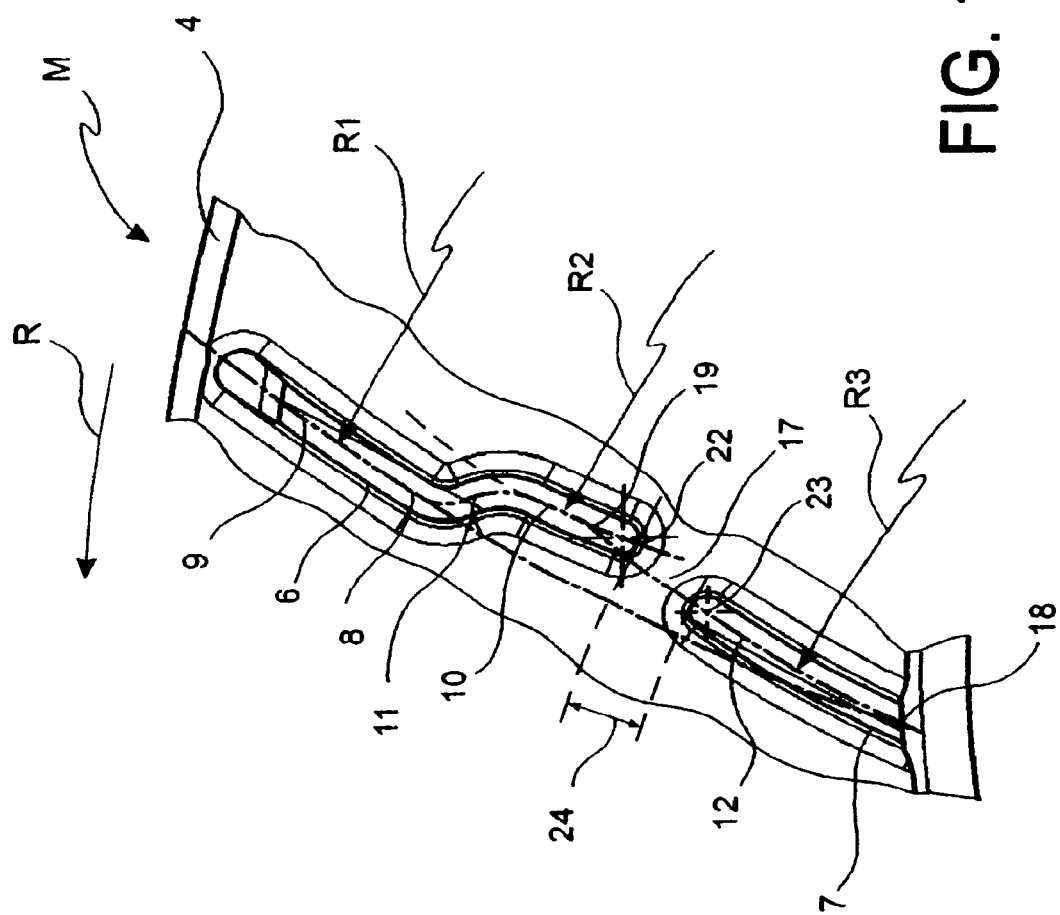
FIG. 10 illustrates an enlargement of a group of connection and spacer elements of the plates of a braking band constituting a module.

Advantageously, in accordance with a preferred embodiment, said second tab 7 is offset with respect to the end 22 of the first tab in the circumferential direction but on the opposite side with respect to the offsetting that is present between the second arched section 10 and the first arched section 9 of the first tab 6, almost, but not quite, aligning the second tab 7 with the first arched section 9 of the first tab ("not quite" because the alignment, in accordance with an embodiment, is not perfect and the concavities R1 and R3 of the first section of the first tab and of the second tab are different to one another; see FIG. 10).

Advantageously, said second longitudinal line 12 of the second tab 7 forms an arc that defines a third concavity R3 that goes the same way along its entire longitudinal extension.

In accordance with an embodiment, this third concavity R3 also faces the same way as the concavities R2 and R1 of the first tab 7.

Figure 6:
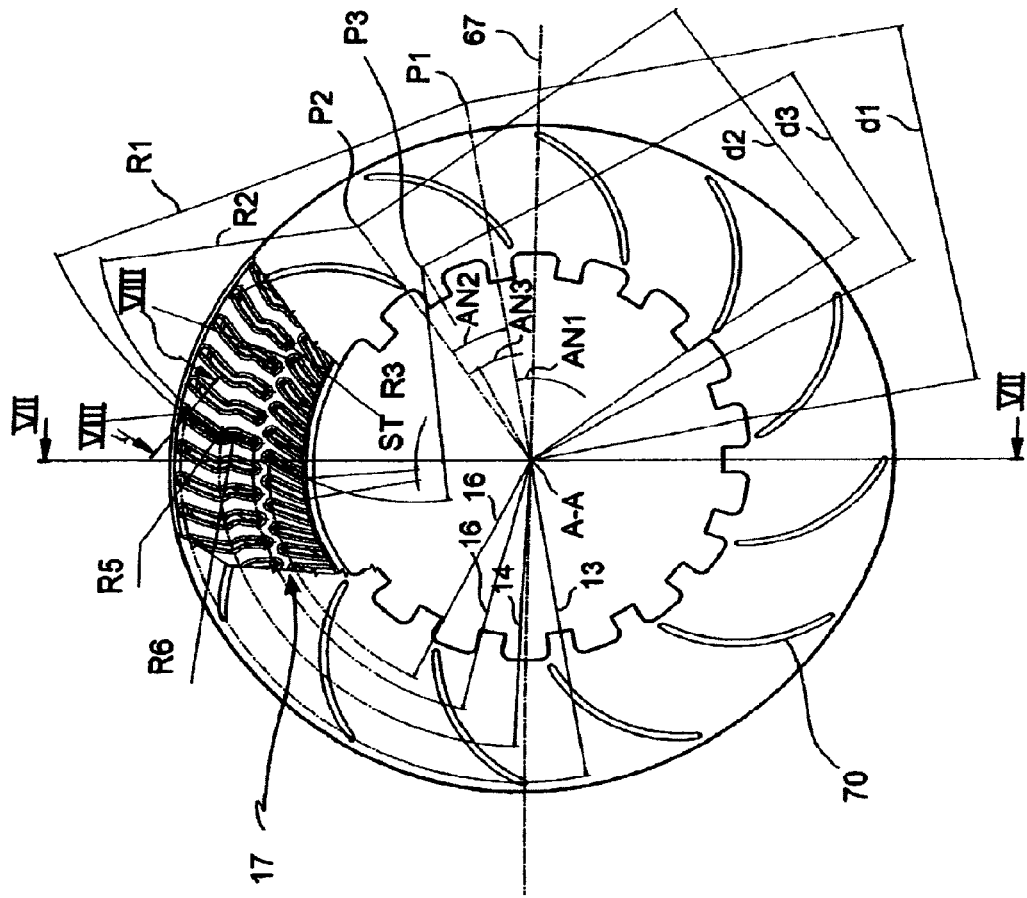
FIG. 6 illustrates a front view of the braking band of FIG. 4 with an angular portion thereof partially sectioned to show the gap between the plates and sections of the tabs for connecting between them.

In accordance with a particular embodiment, as can be seen from FIG. 6, the geometry of the first 6 and of the second tab 7 constituting the module M is obtained starting from a reference radius 67 coming out transversally from the rotation axis A-A. At a predefined angle AN1 with respect to the reference radius 67 and at a predefined distance "d1" from the rotation axis A-A a point P1 is identified defining the centre of curvature of the concavity R1 of the first arched section 9 of the first tab 6. Similarly, at a predefined angle AN2 with respect to the radius that connects the centre of curvature P1 to the axis A-A and at a predefined distance "d2" from the rotation axis A-A the centre of curvature P2 is defined defining the concavity R2 of the second arched section 10 of the first tab 6. Advantageously, with respect to the radius passing through the centre of curvature P1 through a predefined angle AN3 and a predefined distance "d3" from the rotation axis A-A the centre of curvature P3 is defined that determines the concavity R3 of the longitudinal line 12 of the second tab 7.

Advantageously, in accordance with a general embodiment, the group of connection and spacing elements comprises a single first tab 6 that connects the first plate 3 to the second plate 4 of the braking band. This first tab has a first arched section 9 having a predefined concavity R1 that goes the same way along the entire extension of this first section 9, as well as a second section 10 having a second concavity R2 that goes the same way along the entire extension of this second section 10. Advantageously, this second arched section 10 is circumferentially offset with respect to the first arched section 9. Preferably, a third intermediate section 11 for joining between the first section 9 and the second arched section 10 is foreseen, which is substantially shaped like an "S".

Figure 8:
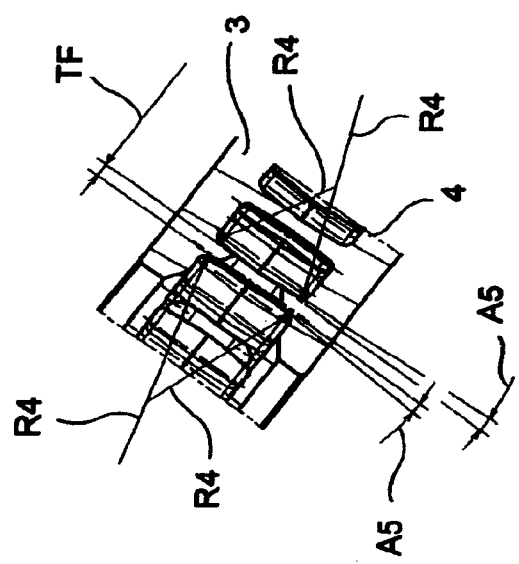
FIG. 8 illustrates a local section according to the line VIII-VIII of FIG. 6 of the braking band of FIG. 4.

In accordance with an embodiment, the tabs 6, 7 have a thickness transversal to the longitudinal extension 8, 12 of predefined size, in the figures indicated with reference letters TF (FIG. 8).

In accordance with an embodiment, said tabs 6, 7 are joined in their connection points to the plates 3, 4 with joining spokes R4 and they have a wall with side surfaces equipped with rakes AS.

In accordance with an embodiment, the intermediate section 11 of the first tab 6 has a first shaped joining portion with curvature R5 and a second shaped section with accentuated curvature R6 followed by a further change of curvature in order to join to the arched section 10 of the first tab with curvature R2.

The group of connection and spacing elements 6, 7, in accordance with an embodiment, constitute a module M repeated according to a circumferential direction coaxial with the braking band. Said module is repeated uniformly distributed in the gap 5 of the braking band 1. For example, between one module and the next one there is a predefined angle defining the pitch ST of the modules or of the group of connection and spacing elements 6, 7.

In accordance with an embodiment said first tab 6 has said first section 9 of the longitudinal line 8 shaped like an arc of circle with radius of predefined size R1.

In accordance with a further embodiment, said second section 10 of the longitudinal line 8 of the first tab 6 is an arc of circle of predefined concavity R2 and of different size with respect to the concavity of the first section 9 of the longitudinal line 8 of the first tab 6.

In accordance with an embodiment said first tab 6 extends radially for a shorter section than the overall radial extension of the braking band B.

In accordance with an embodiment, said first tab 6 has said second section 10 of the longitudinal line 8 that is circumferentially offset with respect to the first section 9 of the longitudinal line 8 by an amount equal to or greater than the thickness of the first tab 6 when this thickness is evaluated transversally to the line of longitudinal extension or middle line of the first tab 6.

In accordance with an embodiment, said first tab 6 has the first section 9 and the second section 10 of its line of longitudinal extension 8 that have concavity R1, R2 going the opposite way to the rotation R of the disc 2.

In accordance with an embodiment, the first tab 6 extends from a first circumference 13 to a second circumference 14, such circumferences being coaxial to the rotation axis A-A of the braking band 1.

In accordance with an embodiment, said second tab 7 extends from a third circumference 15 to a fourth circumference 16, such circumferences 15, 16 being coaxial to the rotation axis A-A of the braking band. Advantageously, said circumferences 15, 16 are arranged radially inside or towards the rotation axis of the braking band 1 with respect to the first tab 6, so that said second tab 7 does not circumferentially overlap said first tab 6 and leaves a gap, or circumferential channel 17, capable of placing one side of the tabs 6, 7 in fluid communication with the opposite side, between said first tab 6 and said second tab 7.

In accordance with an embodiment said second tab 7 extends so as not to circumferentially overlap the first tab 6. Advantageously, said second tab 7 leaves a distance or a channel or circumferential gap 17 that radially have a predefined size. Advantageously, between the end 22 of the first tab 6 and the facing end 23 of the second tab 7 there is a radial distance of size varying between 10% and 20% of the radial extension B of the braking band 1 (FIG. 10).

In accordance with an embodiment, said second tab 7 is circumferentially offset with respect to the facing end 22 of the first tab 6 by a predefined distance that is less than the distance between two first tabs 6 foreseen in two facing and contiguous modules.

In other words, the angle A6 between the facing ends 22 and 23 of the first tab 6 and of the second tab 7 is less than the angle A6' between the end 22 of the first tab 6 and the adjacent end 22' of the adjacent tab 6' (FIG. 5).

In accordance with an embodiment said second tab 7 extends according to an arched longitudinal direction 12 that has concavity R3 going the opposite way to the direction of rotation R of the braking band 1.

In accordance with an embodiment, said first section 9 of the first longitudinal line 8 of the first tab 6 extends along a first arc of circumference the extension of which beyond said first tab 6 is incident in the point indicated with reference numeral 18 of FIG. 10 with the extension of the second longitudinal line 12 of the second tab 7 going towards the axis A-A of the braking band 1.

In accordance with a further embodiment said second tab 7 extends along a circumference the extension of which beyond the extension of said second tab 7 is incident at a point indicated with reference numeral 19 in FIG. 10, said second section 10 of extension of said first tab 6 going away from said rotation axis A-A of the braking band 1.

In accordance with a preferred embodiment none of the tabs for connecting the two plates 3, 4 pokes out from the gap 5 or ventilation channel. In other words, the connection between the braking band and the bell is done by other means different from the tabs 6, 7 described above.

Thanks to the braking bands and the discs comprising such braking bands as described above it is possible to obtain component with high performance in terms of braking efficiency, disposal of the heat produced during braking and uniformity of structural strength, avoiding the occurrence of deformations and cracks.

Braking bands as described above have been subjected to strength tests and thermal efficiency evaluation, showing, with respect to the solutions of the prior art and for equal mechanical strength, an overall weight of the band even 5% less than known solutions.

In particular, this result can be further modified and accentuated thanks to the fact that the first tab, although shaped to optimise the thermal power exchanged thanks to its peripheral arrangement, i.e. radially farther away with respect to the rotation axis of the band, and thanks to its configuration with two sections offset from one another in the circumferential direction and joined with an S-shaped portion, optionally allows the thickness of the tab transversal to the longitudinal extension of the tab itself to be reduced, at the same time keeping a connection distributed over a wide area of the inner surfaces of the plates of the braking band, ensuring a high and more uniform resistance to thermal stresses.

For the same resistance, the geometric proposal, as well as being lighter, proves capable of obtaining lower operating temperatures of the disc for a disc brake and ensuring a higher thermal power exchanged.

Figure 11:
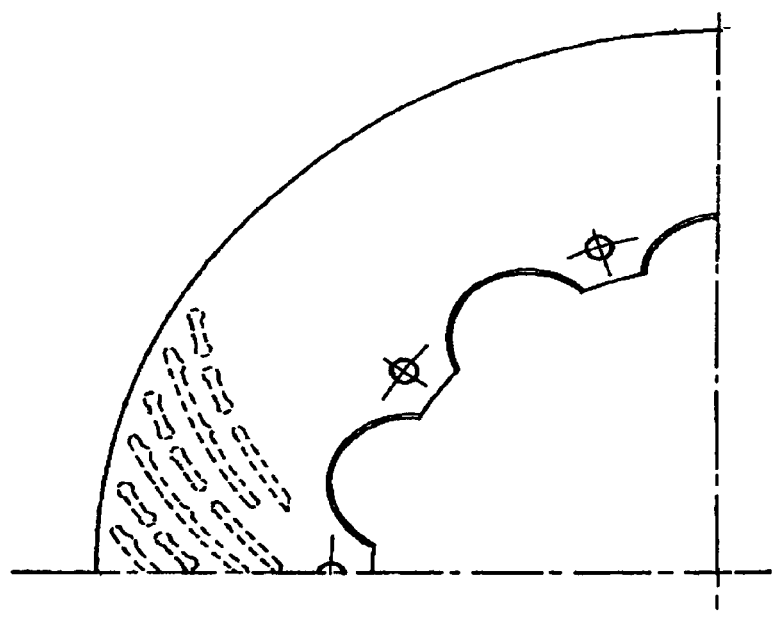
FIG. 11 illustrates a front section view of a portion of a disc for a disc brake made according to the state of the art of patent EP 1 352 179.
Figure 12:
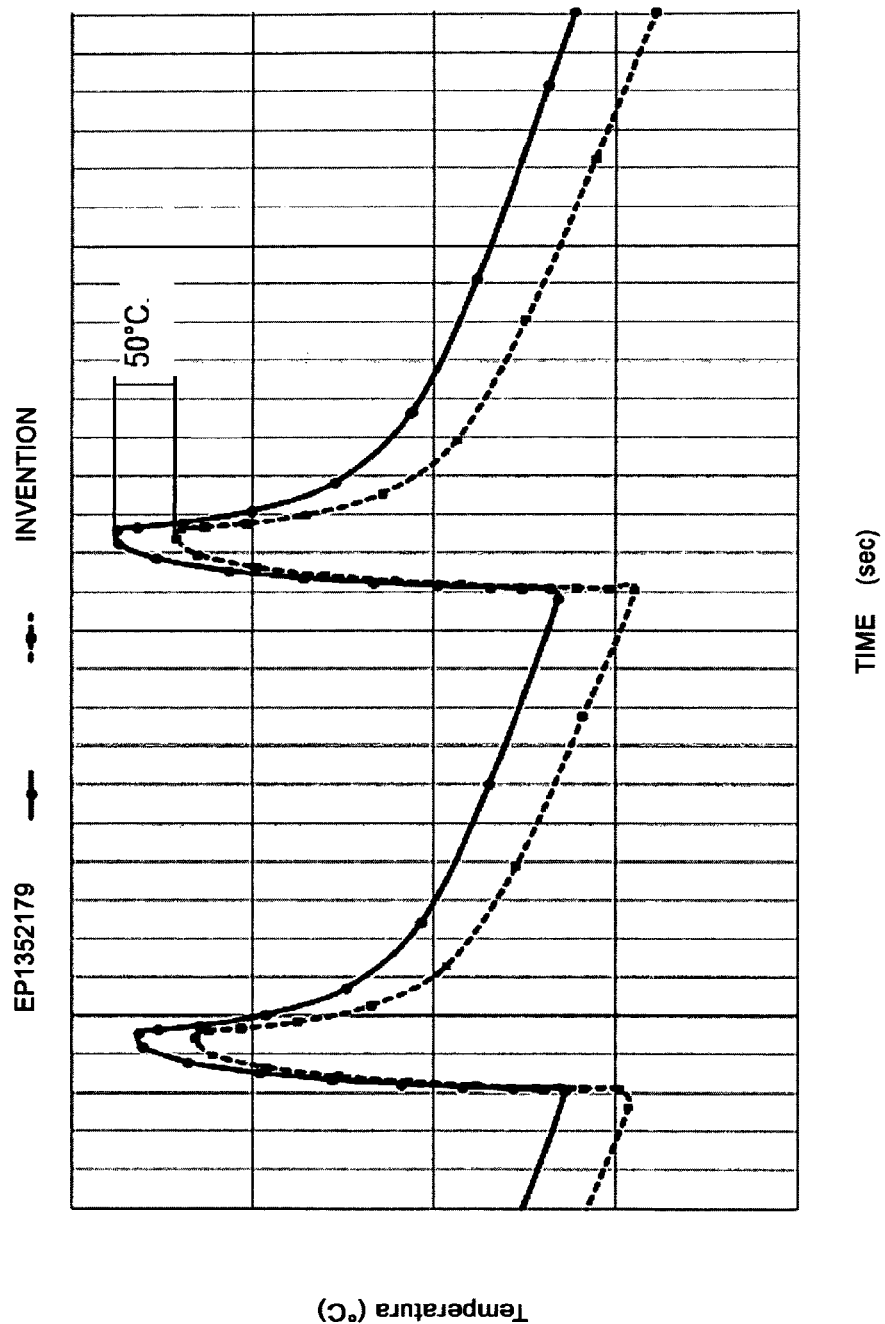
FIG. 12 illustrates a graph showing the temperatures as a function of time of a solution made according to the state of the art of patent EP 1 352 179 compared with the solution of FIG. 4.
Figure 13:
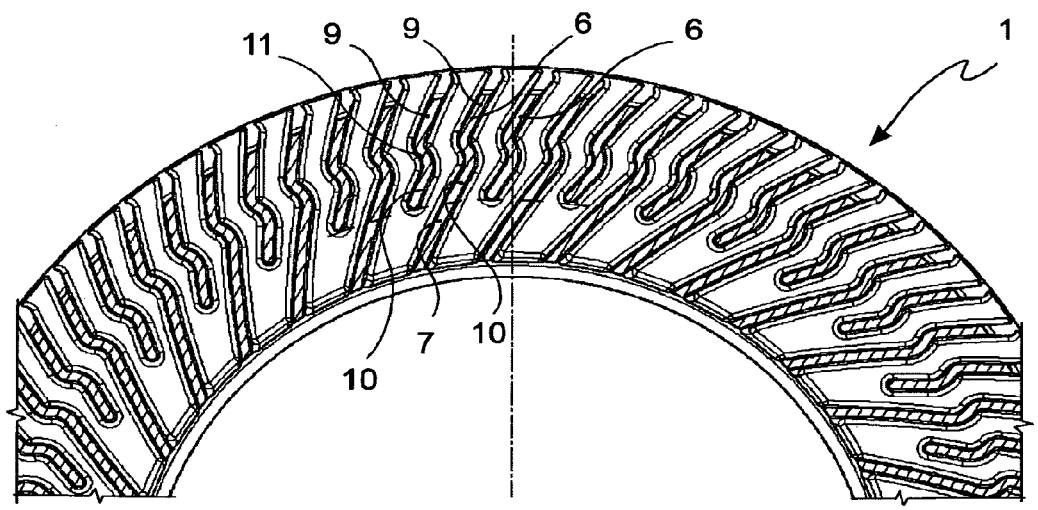
FIG. 13 illustrates a section view of a portion of a braking band made according to a further embodiment of the invention.
Figure 14:
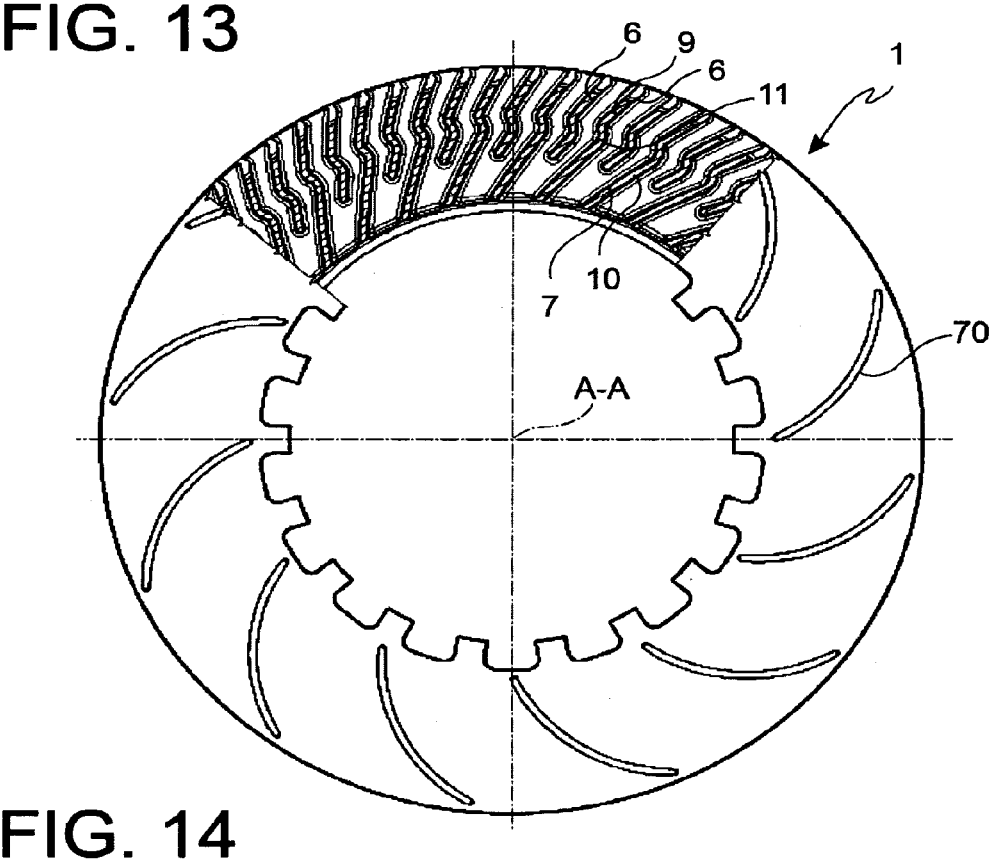
FIG. 14 illustrates a partially sectioned front view of a braking band made according to a further embodiment of the invention in which in the ventilation channels there are spacer elements similar to those of FIG. 13 and at least one of the braking surfaces or both of them have grooves.
Figure 15:
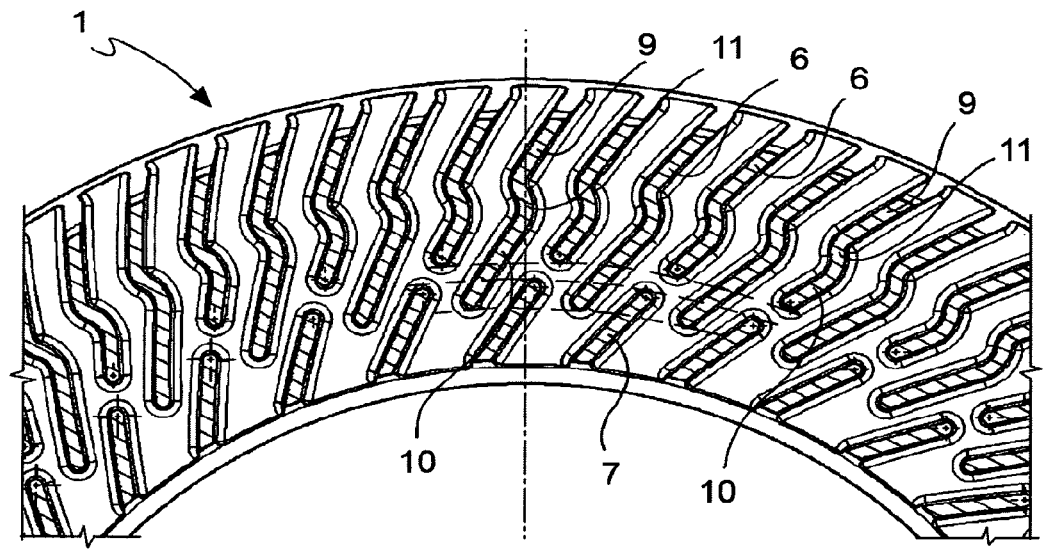
FIG. 15 illustrates a section view of a portion of a braking band made according to a yet further embodiment of the invention.
Figure 16:
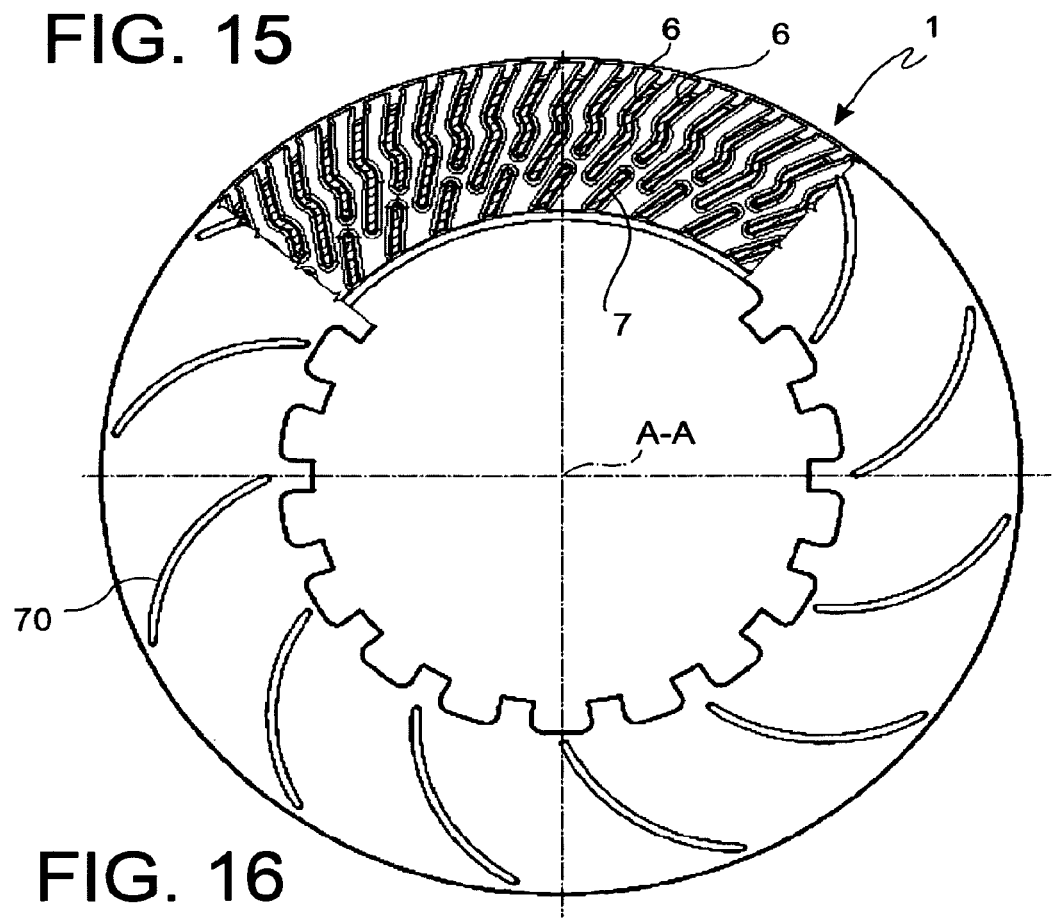
FIG. 16 illustrates a partially sectioned front view of a braking band made according to a further embodiment of the invention in which in the ventilation channel there are spacer elements similar to those of FIG. 15 and at least one of the braking surfaces or both of them have grooves.
Figure 17:
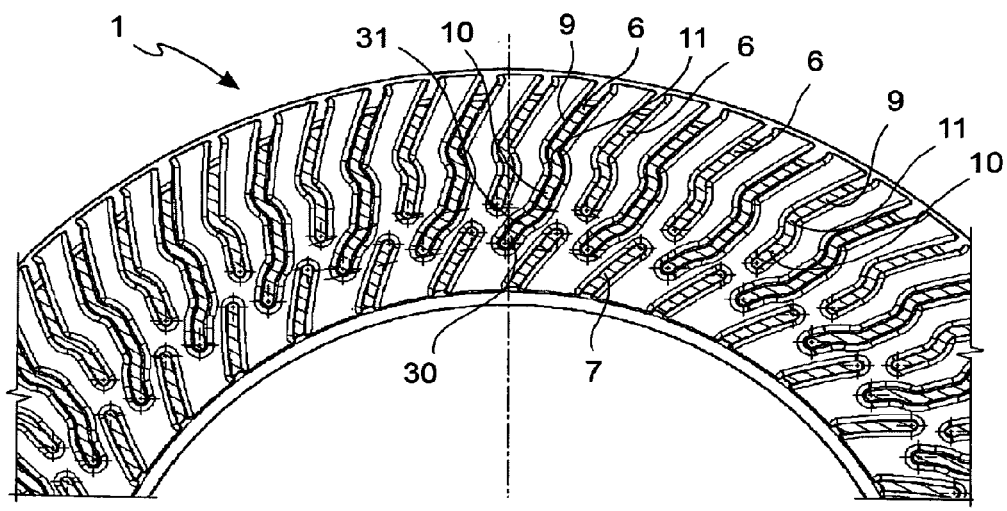
FIG. 17 illustrates a section view of a portion of a braking band made according to a further embodiment of the invention.
Figure 18:
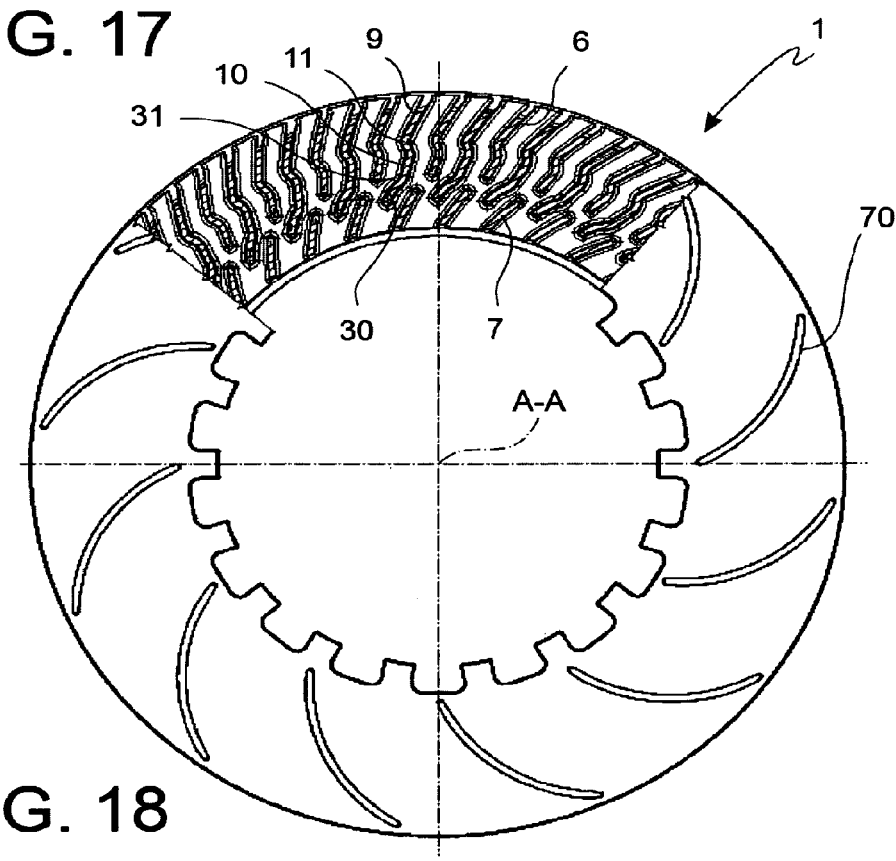
FIG. 18 illustrates a partially sectioned front view of a braking band made according to a further embodiment of the invention in which in the ventilation channel there are spacer elements similar to those of FIG. 17 and at least one of the braking surfaces or both of them have grooves.
Figure 19:
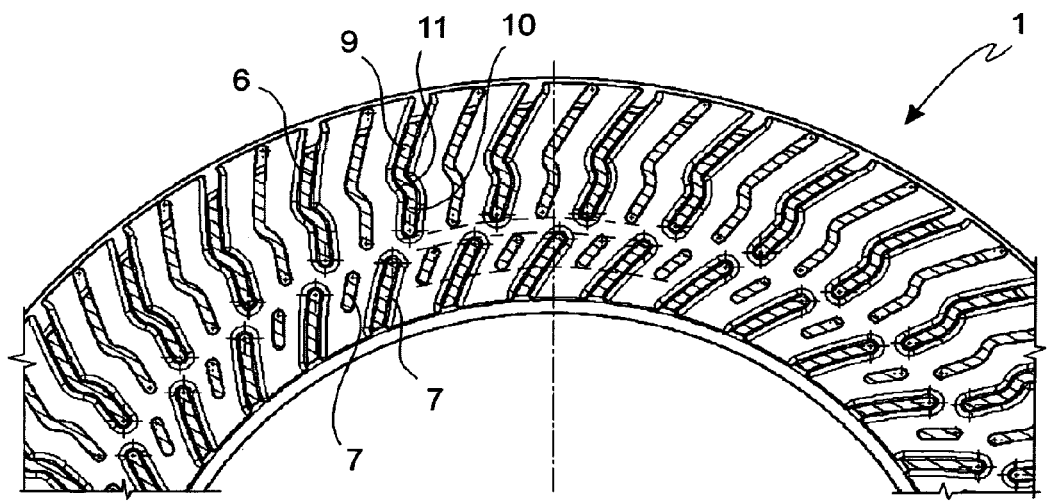
FIG. 19 illustrates a section view of a portion of a braking band made according to a further embodiment of the invention.
Figure 20:
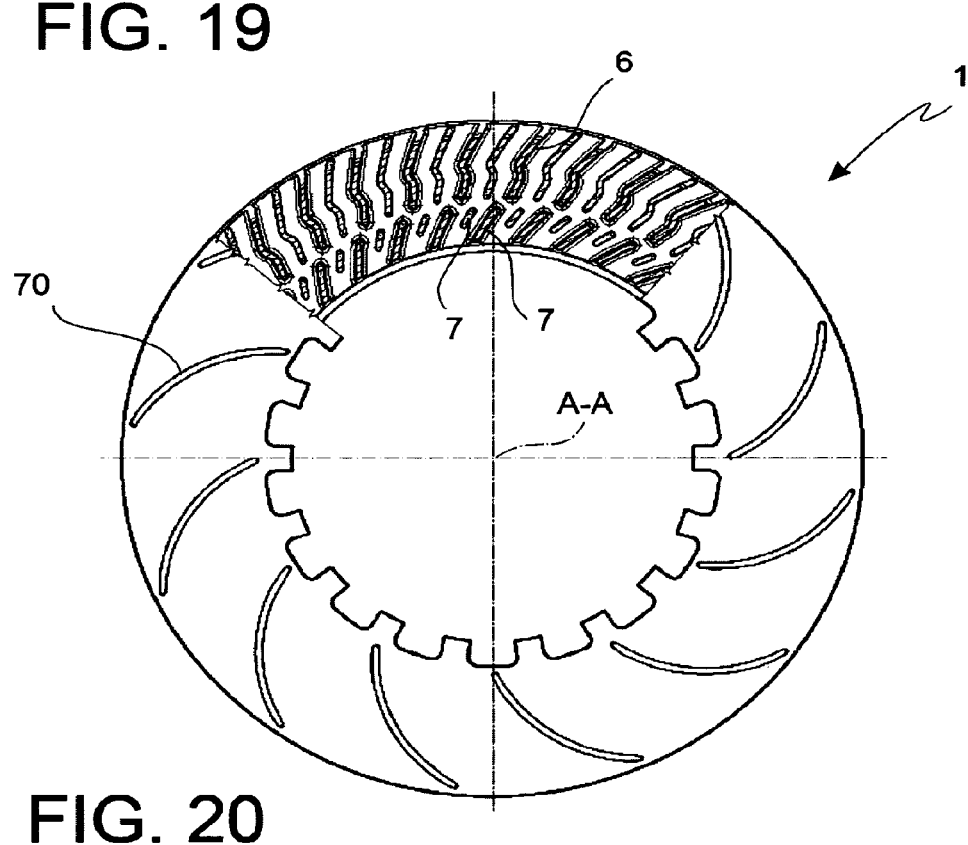
FIG. 20 illustrates a partially sectioned front view of a braking band made according to a further embodiment of the invention in which in the ventilation channel there are spacer elements similar to those of FIG. 19 and at least one of the braking surfaces or both of them have grooves.

For example, as can be seen from FIGS. 11 and 12, a comparison of the temperature curves has been made between the solution of the state of the art described in EP 1 352 179 and the present invention, highlighting, when used in a sports car after a braking cycle, a maximum temperature reduced by 50° C. and a temperature transient similarly kept very low, as can be seen from FIG. 12.

Moreover, the geometry proposed for the tabs has allowed a more uniform distribution of the temperature inside the braking band to be obtained, ensuring an even lower thermal stress avoiding deforming the plates outside of the baking plane or even avoiding creating cracks in the braking surfaces that propagate inside the body of the braking band.

The described solutions have been the object of laboratory tests from which it has emerged that for the same thermal cycle a braking band having the characteristics highlighted above displayed a reduction in the maximum temperature reached with respect to the state of the art of even 50°-80° C.

This gain in reduced maximum temperature reached by the braking band is also due to a better heat exchange efficiency given by the geometry created in the gap by the fins described above.

In accordance with an embodiment, the inclination of the tabs 6, 7 with respect to the radial direction r-r, particularly the inclination of the tab 7 arranged closer to the rotation axis A-A, creates a flow of air during the rotation of the disc 2 having a radial component of the speed that is prevalent or more accentuated with respect to the solutions of the state of the art, making it possible to have a flow of air that extends mostly in the radial direction.

In accordance with an embodiment, the provision of a circumferential channel 17 between the tabs 6 and 7 makes a reduction of area in the gap 5 between the end 23 of the inner tab 7 and the end 22 of the outer tab 6, creating an acceleration of the flow of air that directs said flow of air against the central portion of the outer tab 6, accentuating the heat exchange and maximising the power exchanged between the flow of air and the finning of the disc.

In accordance with an embodiment, a braking band 1 of a disc 2 for a disc brake comprises tabs of longitudinal extension having a different shape to what has been described earlier. Said group of spacer elements 6, 7 comprises a first tab 6 that connects the first plate 3 to the second plate 4 and that extends according to a longitudinal line 8 forming a first straight section 9 and a second straight section 10. Said second section 10 is circumferentially offset with respect to said first section 9. Said line of longitudinal extension 8 of the first tab 6 comprises an intermediate section 11 for joining between the first and the second straight sections shaped like an "S". Said group of spacer elements also comprises a second tab 7 that extends according to a second longitudinal line 12 proceeding substantially radially from one of the ends of said first tab 6 and leaving circumferentially offset with respect to said end of the first tab 6. Said second longitudinal line 12 forms a straight section.

In accordance with an embodiment, at least one first tab 6 comprises said second section 10 that extends so as to overlap said second tab 7 in the circumferential direction.

In accordance with an embodiment, a plurality of first tabs 6 are foreseen having different longitudinal extension or in different groups, in which some tabs have shorter longitudinal extension than others, and/or in which said second tab 7 is arranged as a substantial radial continuation of said first tab 6 with shorter longitudinal extension.

In accordance with an embodiment, said second tab 7 is a plurality of tabs in lesser number than the first tabs 6, for example in a number equal to half the first tabs 6.

In accordance with an embodiment, said second tabs leave empty spaces between them.

In accordance with an embodiment, said first tab 6 comprises a third section 30 of predefined longitudinal extension, said third section 30 being circumferentially offset with respect to said second section 10. In accordance with an embodiment, there is also a second intermediate section 31 for joining between said second section 10 and said third section 30, in which said intermediate section 31 is shaped like an "S".

In accordance with an embodiment, said first tab 6 comprises a third section 30 circumferentially offset on the opposite side to how said second section 10 is offset with respect to said first section 9 of the first tab.

In accordance with an embodiment, said second tab 7 is a plurality of second tabs 7 having different longitudinal extensions, in which there are at least second tabs 7 longitudinally shorter than second tabs 7 and at least second tabs longitudinally longer than second tabs 7.

In accordance with an embodiment, the second tab 7 starts out circumferentially offset with respect to said end of the first tab 6.

In accordance with an embodiment, the second tabs 7 all leave aligned with the longitudinal extension of the second section of the first tab.

In accordance with an embodiment, said second tab 7 is joined to the radially inner end of the first tab 6 to constitute a longitudinal extension of the first tab and/or a single first tab.

In accordance with an embodiment, said elongated first tab 6 or single first tab is staggered with a first tab of shorter longitudinal extension and said second tabs are all joined and integrated with the first tabs 6. In accordance with an embodiment, the spacer elements all consist of first tabs, first tabs elongated up to the inner diameter of the band and shorter first tabs that do not extend up to the inner diameter of the band and, in accordance with an embodiment, are staggered with the longer first tabs.

What is claimed is:

1. A braking band of a disc for a disc brake, comprising:
   a first plate and a second plate, arranged facing one another so as to form a gap;
   a group of connection-spacer elements connecting the first plate and the second plate, said group comprising a module repeated according to a circumferential direction coaxial with the braking band itself;
   wherein said group of spacer elements comprises a first tab that connects the first plate to the second plate and that extends according to a longitudinal line forming a first straight section and a second straight section, said second section being circumferentially offset with respect to said first section; said line of longitudinal extension of the first tab comprising an intermediate section for joining between the first and the second straight sections, the intermediate section consisting essentially of two curved portions having an inflection point between the two curved portions; said first tab contacting a radially outer annular portion of the braking band and extending toward an inner annular portion of the braking band;
   wherein said group of spacer elements further comprises a second, separately provided tab that connects the first plate to the second plate; said second tab being of shorter longitudinal extension than the first tab.

2. The braking band of claim 1, wherein the second tab extends according to a second longitudinal line proceeding substantially radially from one of the ends of said first tab and leaving circumferentially offset with respect to said end of the first tabs.

3. The braking band of claim 1, wherein the second straight section extends so as to overlap said second tab in a circumferential direction.

4. The braking band of claim 1, wherein said second tab comprises a plurality of tabs less numerous than the first tabs.

5. The braking band of claim 1, wherein said first tab comprises a third section of longitudinal extension, said third section being circumferentially offset with respect to said second section; and a second intermediate section for joining between said second section and said third section, said intermediate section consisting essentially of two curved portions having an inflection point between the two curved portions.

6. The braking band of claim 1, wherein said first tab comprises a third section circumferentially offset with respect to how said second section is offset with respect to said first section.

7. The braking band of claim 1, wherein said second tab is circumferentially offset with respect to said end of the first tab.

8. The braking band of claim 1, wherein said module comprises said first tab and said second tab.

\* \* \* \* \*